(12) United States Patent
Jain et al.

(10) Patent No.: US 8,408,491 B2
(45) Date of Patent: Apr. 2, 2013

(54) NACELLE ASSEMBLY HAVING INLET AIRFOIL FOR A GAS TURBINE ENGINE

(75) Inventors: Ashok K. Jain, Tempe, AZ (US); Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 990 days.

(21) Appl. No.: 11/739,216

(22) Filed: Apr. 24, 2007

(65) Prior Publication Data
US 2008/0267762 A1    Oct. 30, 2008

(51) Int. Cl.
*B64D 33/02* (2006.01)

(52) U.S. Cl. .......... 244/53 B; 60/226.2; 60/230; 60/262; 60/226.1; 415/119; 415/914; 415/126; 415/220; 415/221

(58) Field of Classification Search .................. 415/119, 415/914, 126, 220, 221; 244/53 B; 137/15.1; 60/226.1, 226.2, 230, 262
See application file for complete search history.

(56) References Cited

U.S. PATENT DOCUMENTS

| | | | |
|---|---|---|---|
| 2,632,295 A * | 3/1953 | Price | 137/15.1 |
| 2,948,111 A | 5/1955 | Nelson | |
| 2,915,262 A | 12/1959 | Klein | |
| 3,059,878 A | 10/1962 | Kerry et al. | |
| 3,074,232 A | 1/1963 | Soyer | |
| 3,119,581 A | 1/1964 | Trevaskis | |
| 3,222,863 A | 12/1965 | Klees et al. | |
| 3,298,637 A | 1/1967 | Lee | |
| 3,422,624 A | 1/1969 | Brooks et al. | |
| 3,524,611 A | 8/1970 | Frank | |
| 3,532,100 A | 10/1970 | Hilton | |
| 3,541,794 A | 11/1970 | Johnston et al. | |
| 3,568,694 A * | 3/1971 | Johnson | 137/15.1 |
| 3,575,259 A * | 4/1971 | Wilkinson | 181/214 |
| 3,583,417 A | 6/1971 | Clark | |
| 3,611,724 A | 10/1971 | Kutney | |
| 3,618,699 A | 11/1971 | Evans | |
| 3,618,876 A * | 11/1971 | Skidmore et al. | 244/53 B |
| 3,623,328 A | 11/1971 | Pike | |
| 3,623,494 A | 11/1971 | Poucher | |
| 3,652,036 A * | 3/1972 | Sans et al. | 244/53 B |
| 3,662,556 A * | 5/1972 | Poucher et al. | 60/226.1 |
| 3,664,612 A | 5/1972 | Skidmore et al. | |
| 3,699,682 A | 10/1972 | Kleckner | |

(Continued)

FOREIGN PATENT DOCUMENTS

| | | |
|---|---|---|
| FR | 980347 | 12/1950 |
| GB | 1312619 | 4/1973 |

(Continued)

OTHER PUBLICATIONS

Extended European Search Report for Application No. 08252429.9 mailed Nov. 26, 2008.

(Continued)

*Primary Examiner* — Phutthiwat Wongwian
*Assistant Examiner* — Craig Kim
(74) *Attorney, Agent, or Firm* — Carlson, Gaskey & Olds PC

(57) ABSTRACT

A nacelle assembly includes an inlet lip section and an airfoil adjacent to the inlet lip section. The airfoil is selectively moveable between a first position and a second position to adjust the flow of oncoming airflow and to influence an effective boundary layer thickness of the nacelle assembly.

23 Claims, 5 Drawing Sheets

U.S. PATENT DOCUMENTS

| | | | |
|---|---|---|---|
| 3,736,750 | A | 6/1973 | Britt |
| 3,763,874 | A | 10/1973 | Wilde et al. |
| 3,770,228 | A | 11/1973 | Traksel et al. |
| 3,905,566 | A | 9/1975 | Anderson |
| 4,012,013 | A | 3/1977 | Ball et al. |
| 4,044,973 | A | 8/1977 | Moorehead |
| 4,083,181 | A | 4/1978 | Adamson |
| 4,132,240 | A | 1/1979 | Frantz |
| 4,147,029 | A | 4/1979 | Sargisson |
| 4,154,256 | A | 5/1979 | Miller |
| 4,220,171 | A | 9/1980 | Ruehr et al. |
| 4,475,702 | A | 10/1984 | Cole |
| 4,722,357 | A | 2/1988 | Wynosky |
| 4,738,416 | A | 4/1988 | Birbragher |
| 4,865,268 | A | 9/1989 | Tracksdorf |
| 4,899,958 | A * | 2/1990 | Horikawa .................. 244/53 B |
| 4,912,921 | A | 4/1990 | Rice et al. |
| 4,993,663 | A | 2/1991 | Lahti et al. |
| 5,000,399 | A | 3/1991 | Readnour et al. |
| 5,012,639 | A | 5/1991 | Ream et al. |
| 5,014,933 | A | 5/1991 | Harm et al. |
| 5,058,617 | A | 10/1991 | Stockman et al. |
| 5,127,222 | A | 7/1992 | Ream et al. |
| 5,141,182 | A | 8/1992 | Coffinberry |
| 5,143,329 | A | 9/1992 | Coffinberry |
| 5,145,126 | A | 9/1992 | Patilla |
| 5,156,362 | A | 10/1992 | Leon |
| 5,177,957 | A | 1/1993 | Grieb |
| 5,261,227 | A | 11/1993 | Giffin, III |
| 5,284,012 | A | 2/1994 | Laborie et al. |
| 5,297,765 | A | 3/1994 | Hughes et al. |
| 5,349,814 | A * | 9/1994 | Ciokajlo et al. ............. 60/226.1 |
| 5,351,476 | A | 10/1994 | Laborie et al. |
| 5,357,742 | A | 10/1994 | Miller |
| 5,447,283 | A | 9/1995 | Tindell |
| 5,568,724 | A | 10/1996 | Lindner et al. |
| 5,586,431 | A | 12/1996 | Thonebe et al. |
| 5,593,112 | A | 1/1997 | Maier et al. |
| 5,725,182 | A | 3/1998 | Valleroy |
| 5,727,380 | A | 3/1998 | Lardy et al. |
| 5,732,547 | A | 3/1998 | Olsen et al. |
| 5,743,488 | A | 4/1998 | Rolston et al. |
| 5,803,410 | A | 9/1998 | Hwang |
| 5,813,625 | A | 9/1998 | Hassan et al. |
| 5,841,079 | A | 11/1998 | Parente |
| 5,934,611 | A | 8/1999 | Tindell et al. |
| 5,971,328 | A | 10/1999 | Kota |
| 5,987,880 | A | 11/1999 | Culbetson |
| 6,055,805 | A | 5/2000 | El-Aini et al. |
| 6,089,505 | A | 7/2000 | Gruensfelder et al. |
| 6,109,566 | A | 8/2000 | Miller et al. |
| 6,129,309 | A | 10/2000 | Smith et al. |
| 6,129,311 | A | 10/2000 | Welch et al. |
| 6,170,253 | B1 | 1/2001 | Newton |
| 6,179,251 | B1 | 1/2001 | Tindell et al. |
| 6,231,006 | B1 | 5/2001 | Gruensfelder et al. |
| 6,259,976 | B1 | 7/2001 | Lemelson et al. |
| 6,260,567 | B1 | 7/2001 | Gruensfelder et al. |
| 6,334,753 | B1 | 1/2002 | Tillman et al. |
| 6,340,135 | B1 | 1/2002 | Barton |
| 6,360,989 | B1 | 3/2002 | Maguire |
| 6,375,118 | B1 | 4/2002 | Kibens et al. |
| 6,379,110 | B1 | 4/2002 | McCormick et al. |
| 6,390,418 | B1 | 5/2002 | McCormick et al. |
| 6,471,477 | B2 | 10/2002 | Hassan et al. |
| 6,651,929 | B2 | 11/2003 | Dionne |
| 6,655,632 | B1 * | 12/2003 | Gupta et al. ................ 244/53 B |
| 6,698,691 | B2 | 3/2004 | Porte |
| 6,708,711 | B2 | 3/2004 | Surply et al. |
| 6,763,651 | B2 | 7/2004 | Shmilovich et al. |
| 6,764,043 | B2 | 7/2004 | Sankrithi et al. |
| 6,793,177 | B2 | 9/2004 | Bonutti |
| 6,971,229 | B2 | 12/2005 | Lair |
| 7,048,229 | B2 | 5/2006 | Sanders et al. |
| 7,048,230 | B2 | 5/2006 | Meyer |
| 7,090,165 | B2 | 8/2006 | Jones et al. |
| 7,131,612 | B2 | 11/2006 | Baptist et al. |
| 7,165,744 | B2 | 1/2007 | Howarth et al. |
| 7,255,309 | B2 | 8/2007 | Boldrin et al. |
| 7,617,670 | B2 | 11/2009 | Truax et al. |
| 7,739,865 | B2 | 6/2010 | Prasad et al. |
| 7,766,280 | B2 | 8/2010 | Cloft et al. |
| 7,802,760 | B2 | 9/2010 | Webster |
| 7,870,721 | B2 | 1/2011 | Winter et al. |
| 2004/0237534 | A1 | 12/2004 | Webster et al. |
| 2005/0060982 | A1 | 3/2005 | Mani et al. |
| 2005/0274103 | A1 | 12/2005 | Prasad et al. |
| 2006/0155432 | A1 | 7/2006 | Brown |
| 2007/0221788 | A1 | 9/2007 | Meister |
| 2008/0092548 | A1 | 4/2008 | Morford et al. |
| 2008/0112799 | A1 | 5/2008 | Winter et al. |
| 2008/0267762 | A1 | 10/2008 | Jain et al. |
| 2008/0283676 | A1 | 11/2008 | Jain et al. |
| 2008/0286094 | A1 | 11/2008 | Jain |
| 2009/0003997 | A1 | 1/2009 | Jain et al. |
| 2009/0008508 | A1 | 1/2009 | Jain et al. |
| 2009/0121083 | A1 | 5/2009 | Jain |

FOREIGN PATENT DOCUMENTS

| GB | 1336724 | 11/1973 |
|---|---|---|
| GB | 1382809 | 2/1975 |

OTHER PUBLICATIONS

Extended European Search Report for Application No. EP 08 25 1047 dated Sep. 6, 2011.
Extended European Search Report for Application No. EP 07 25 4305 dated Aug. 19, 2011.
Extended European Search Report for Application No. EP 08 25 2263 dated Aug. 19, 2011.
Extended European Search Report for Application No. EP 08 25 2429 dated Nov. 26, 2008.
U.S. Appl. No. 11/584,030, filed Oct. 20, 2006, Morford, et al.
U.S. Appl. No. 11/595,040, filed Nov. 10, 2006, Winter, et al.
U.S. Appl. No. 11/749,260, filed May 16, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/769,749, filed Jun. 28, 2007, Jain, et al.

* cited by examiner

NACELLE ASSEMBLY HAVING INLET AIRFOIL FOR A GAS TURBINE ENGINE

BACKGROUND OF THE INVENTION

This invention generally relates to a gas turbine engine, and more particular to a nacelle assembly for a turbofan gas turbine engine.

In an aircraft gas turbine engine, such as a turbofan engine, air is pressurized in a compressor and mixed with fuel in a combustor for generating hot combustion gases. The hot combustion gases flow downstream through turbine stages which extract energy from the hot combustion gases. A fan supplies air to the compressor.

Combustion gases are discharged from the turbofan engine through a core exhaust nozzle and a quantity of fan air is discharged through an annular fan exhaust nozzle defined at least partially by a nacelle assembly surrounding the core engine. A majority of propulsion thrust is provided by the pressurized fan air which is discharged through the fan exhaust nozzle, while the remaining thrust is provided from the combustion gases discharged through the core exhaust nozzle.

The fan section of a turbofan gas turbine engine may be geared to control a tip speed of the fan section. The ability to reduce the fan section tip speed results in decreased noise due to the fan section tip speed being lower than the speed of the rotating compressor. Controlling the fan section tip speed allows the fan section to be designed with a larger diameter, which further decreases noise. However, the nacelle assembly of the turbofan engine must be large enough to support the large diameter fan section.

It is known in the field of aircraft gas turbine engines that the performance of a turbofan engine varies during diversified conditions experienced by the aircraft. An inlet lip section located at the foremost end of the turbofan nacelle assembly is typically designed to enable operation of the turbofan engine and reduce the separation of airflow from the inlet lip section of the nacelle assembly during these diversified conditions. For example, the inlet lip section requires a "thick" inlet lip section to support operation of the engine during specific flight conditions, such as crosswind conditions, take-off and the like. Disadvantageously, the "thick" inlet lip section may reduce the efficiency of the turbofan engine during normal cruise conditions of the aircraft. As a result, the maximum diameter of the nacelle assembly may be approximately 10-20% larger than needed at cruise conditions.

In addition, boundary layer separation is a common problem associated with "thin" inlet lip sections. Boundary layer separation occurs where airflow communicated through the inlet lip section separates from the outer and/or inner flow surfaces of the inlet lip section, which may cause engine stall, the loss of the capability to generate thrust, and may decrease engine efficiency.

Attempts have been made to reduce the onset of boundary layer separation within the nacelle assembly. For example, small vortex generators are known which increase the velocity gradient of oncoming airflow near the effective boundary layer of the inlet lip section. In addition, synthetic jets are known which introduce an airflow at the boundary layer to increase the velocity gradient of the oncoming airflow near the boundary separation point. However, these attempts have proved complex, expensive and have not fully reduced the onset of boundary layer separation.

Accordingly, it is desirable to improve the performance of a turbofan gas turbine engine during diversified conditions to provide a nacelle assembly having a reduced thickness, reduced weight and reduced drag.

SUMMARY OF THE INVENTION

A nacelle assembly includes an inlet lip section and an airfoil adjacent to the inlet lip section. The airfoil is selectively moveable between a first position and a second position to adjust the flow of oncoming airflow and influence an effective boundary layer thickness of the nacelle assembly.

A gas turbine engine includes a compressor section, a combustor section, a turbine section, and a nacelle assembly which partially surrounds the compressor section, the combustor section and the turbine section. The nacelle assembly includes an inlet lip section and an airfoil adjacent to the inlet lip section. The airfoil is selectively moveable between a first position and a second position. A controller identifies an operability condition and selectively moves the airfoil between the first position and the second position in response to the operability condition to influence an effective boundary layer thickness of the nacelle assembly.

A method of increasing an effective boundary layer thickness of an inlet lip section of a nacelle of a gas turbine engine includes sensing an operability condition, and selectively translating an airfoil positioned adjacent to the inlet lip section in a radial outward direction relative to the nacelle.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
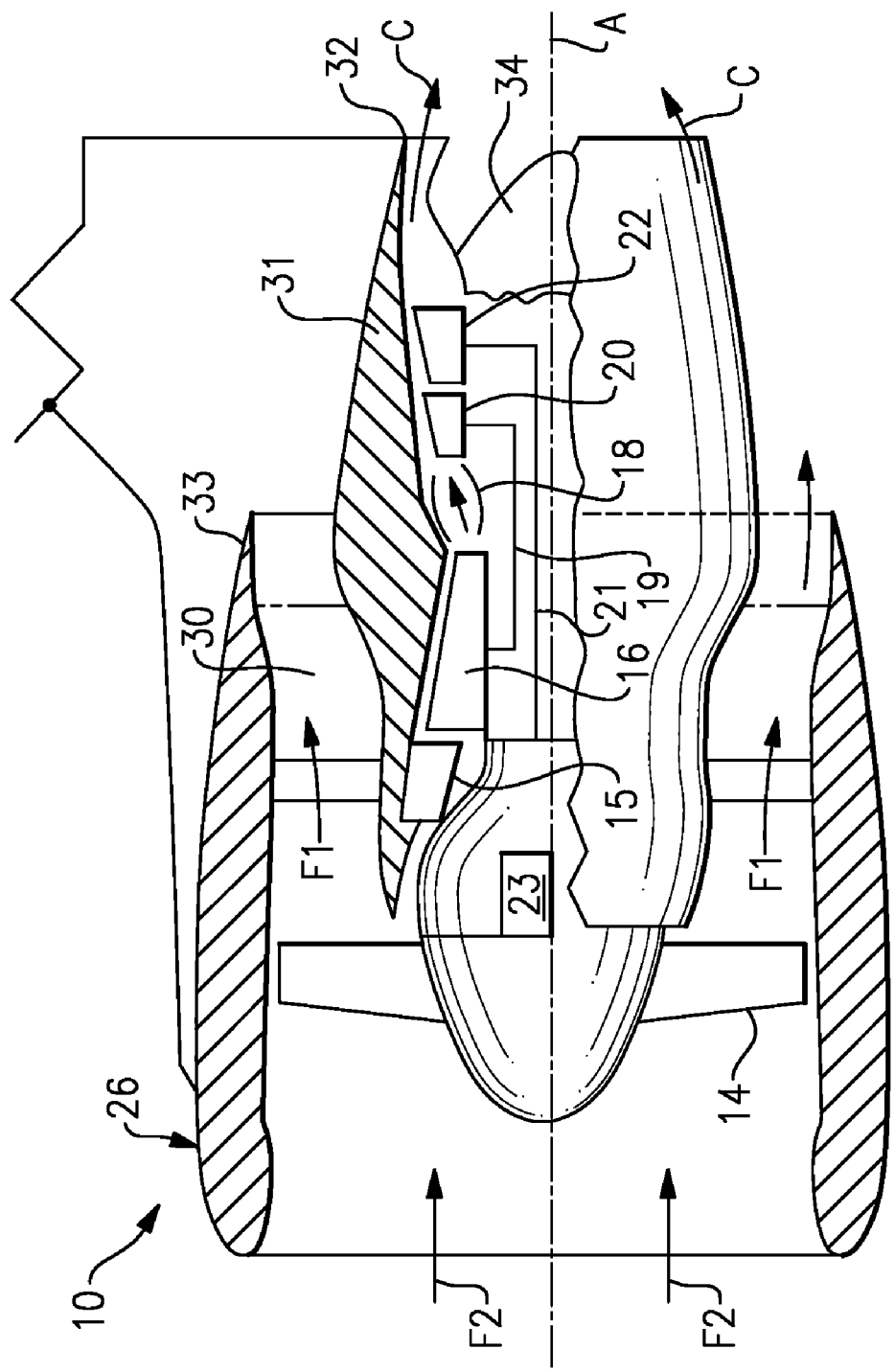
FIG. 1 illustrates a general perspective view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20, and a low pressure turbine 22. During operation, air is pressurized in the compressors 15, 16 and mixed with fuel in the combustor 18 for generating hot combustion gases. During operation, air is pulled into the gas turbine engine 10 by the fan section 14, pressurized by the compressors 15, 16 and is mixed with fuel and burned in the combustor 18. Hot combustion gases generated within the combustor 18 flow through the high and low pressure turbines 20, 22, which extract energy from the hot combustion gases.

In a two spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 15 and the fan section 14 through a low speed shaft 21. However, the invention is not limited to the two spool gas turbine architecture described and may be used with other architecture such as a single spool axial design, a three spool axial design and other architectures. That is, the present invention is applicable to any gas turbine engine, and to any application.

The example gas turbine engine 10 is in the form of a high bypass ratio turbofan engine mounted within a nacelle assembly 26, in which a significant amount of the air pressurized by the fan section 14 bypasses the core engine for the generation of propulsion thrust. The nacelle assembly 26 partially surrounds an engine casing 31. The example illustrated in FIG. 1 depicts a high bypass flow arrangement in which approximately 80% of the airflow entering the fan section 14 may bypass the core engine via a fan bypass passage 30 which extends between the nacelle 26 and the engine casing 31 for receiving and communicating a discharge airflow F1. The high bypass flow arrangement provides a significant amount of thrust for powering an aircraft.

In one example, the bypass ratio (i.e., the ratio between the amount of airflow communicated through the fan bypass passage 30 relative to the amount of airflow communicated through the core engine itself) is greater than 10 and the fan section 14 diameter is substantially larger than the diameter of the low pressure compressor 15. The low pressure turbine 22 has a pressure ratio that is greater than five, in one example. The engine 10 may include a geartrain 23 which reduces the speed of the rotating fan section 14. The geartrain 23 can be any known gear system, such as a planetary gear system with orbiting planet gears, a planetary system with non-orbiting planet gears, or other type of gear system. In the disclosed example, the geartrain 23 has a constant gear ratio. It should be understood, however, that the above parameters are only examples of a contemplated geared turbofan engine. That is, the invention is applicable to a traditional turbofan engine as well as other engine architectures.

The discharge airflow F1 is discharged from the engine 10 through a fan exhaust nozzle 33. Core exhaust gases C are discharged from the core engine through a core exhaust nozzle 32 defined between the engine casing 31 and a center plug 34 disposed coaxially around a longitudinal centerline-axis A of the gas turbine engine 10.

Figure 2:
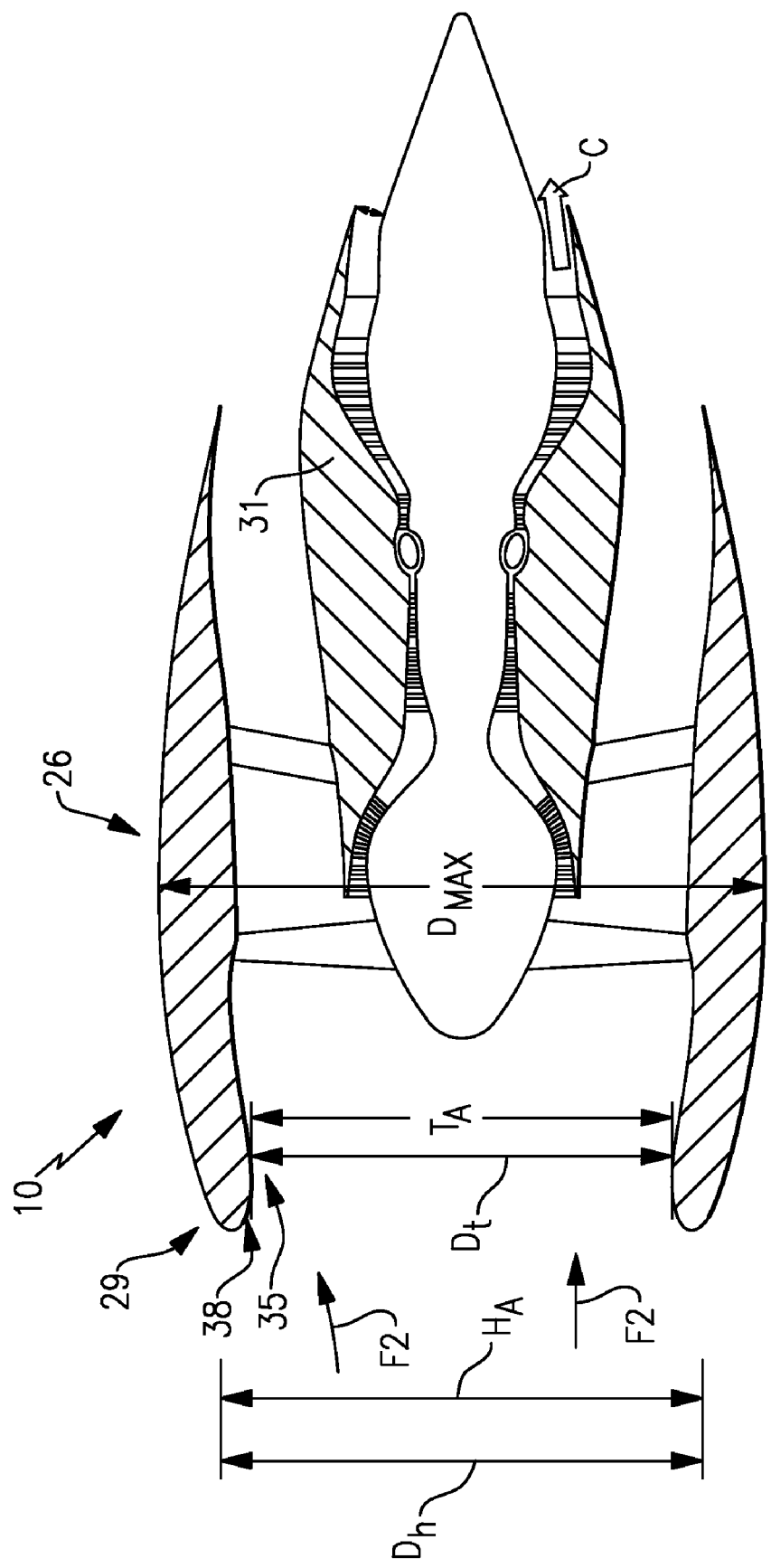
FIG. 2 illustrates a nacelle assembly of the gas turbine engine illustrated in FIG. 1.

FIG. 2 illustrates an example inlet lip section 38 of the nacelle assembly 26. The inlet lip section 38 is positioned near a forward segment 29 of the nacelle assembly 26. A boundary layer 35 is associated with inlet lip section 38. The boundary layer 35 represents an area adjacent to a flow surface of the inlet lip section 38 at which the velocity gradient of airflow is zero. That is, the velocity profile of oncoming airflow F2 goes from a free stream away from the boundary layer 35 to near zero at the boundary layer 35 due to friction forces that occur as the oncoming airflow F2 passes over the outer and inner flow surfaces of the inlet lip section 38.

The inlet lip section 38 of the nacelle assembly 26 defines a contraction ratio. The contraction ratio represents a relative thickness of the inlet lip section 38 of the nacelle assembly 26 and is represented by the ratio of a highlight area $H_a$ (ring shaped area defined by a highlight diameter $D_h$) and a throat area $T_a$ (ring shaped area defined by throat diameter $D_t$) of the inlet lip section 38. Current industry standards typically use a contraction ratio of approximately 1.300 to prevent the separation of the oncoming airflow F2 from the inlet lip section 38, but other contraction ratios may be feasible. "Thick" inlet lip section designs, which are associated with large contraction ratios, increase the maximum diameter $D_{max}$ and increase weight and drag penalties associated with the nacelle assembly 26.

Increasing the relative thickness of the boundary layer 35 of the inlet lip section 38 during specific flight conditions allows the oncoming airflow F2 to smoothly enter the inlet lip section 38 with reduced airflow separation, thereby simulating a "thick" inlet lip section 38 that enables the nacelle assembly 26 to be designed with a reduced contraction ratio. In one example, the increased boundary layer 35 thickness is achieved by translating an airfoil 50 (See FIG. 3) positioned adjacent to the inlet lip section 38 in a radial outward direction relative to the nacelle assembly 26 during specific flight conditions, as is further discussed below.

Figure 3:
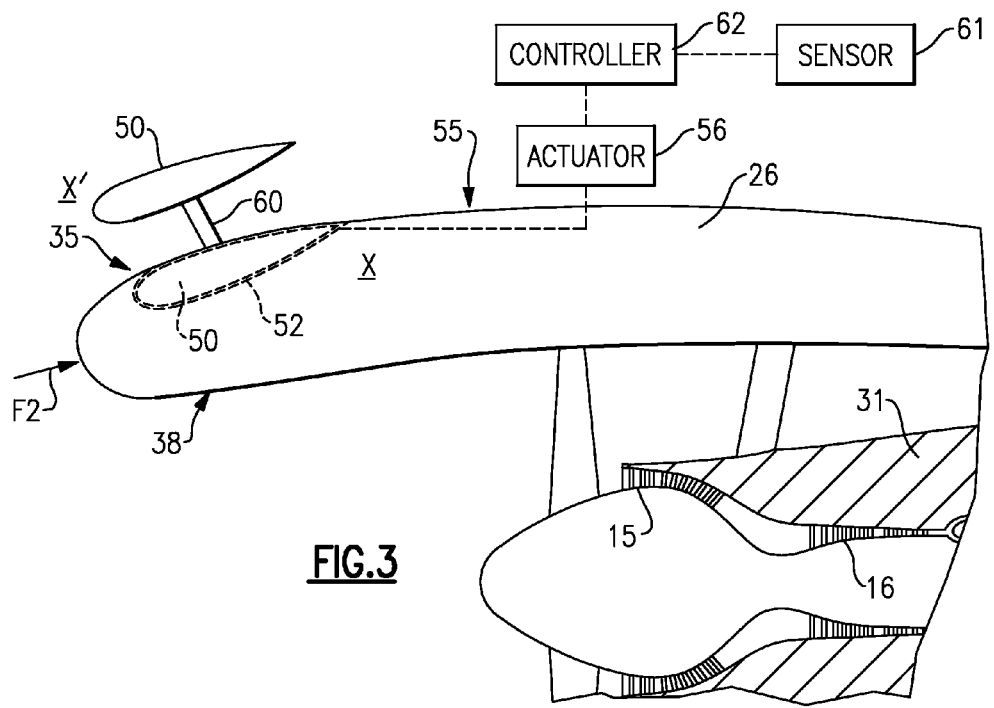
FIG. 3 illustrates an airfoil of the nacelle assembly of the gas turbine engine shown in FIG. 1.

FIG. 3 illustrates an example airfoil 50 of the nacelle assembly 26 of the gas turbine engine 10. In one example, the airfoil 50 is an "intip." "Intips" are individual airfoil sections which are actuable to protrude from the nacelle assembly 26. In another example, the airfoil 50 is a strake. It should be understood that any type of airfoil, including airfoils of varying sizes and shapes, may be utilized in accordance with the example nacelle assembly 26.

Figure 4:
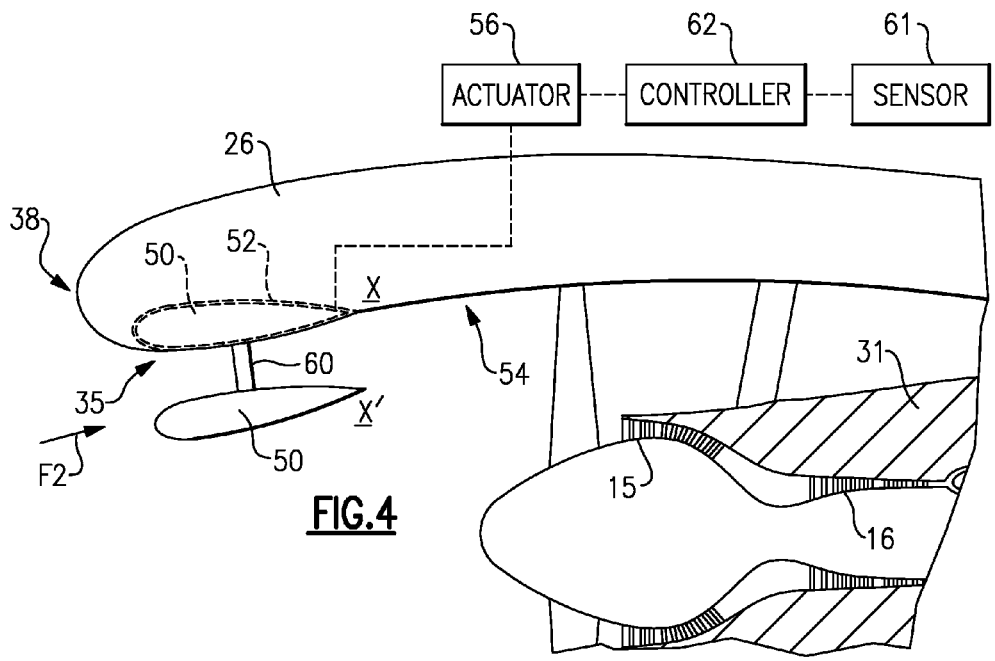
FIG. 4 illustrates another embodiment of the airfoil of the nacelle assembly.

The airfoil 50 is positioned adjacent to the inlet lip section 38 of the nacelle assembly 26. The term "adjacent" as used herein means at any position downstream from the foremost end 29 of the inlet lip section 38 at which the airfoil 50 will have any measurable influence on the boundary layer 35. The airfoil 50 is received within a cavity 52 provided within the nacelle assembly 26. The airfoil 50 is selectively introduced at the boundary layer 35 of the inlet lip section 38. The airfoil 50 is introduced at an exterior wall 55 of the nacelle assembly (see FIG. 3), for example. In another example, the airfoil 50 is introduced near an interior wall 54 of the nacelle assembly 26 (see FIG. 4). In yet another example, an airfoil 50 is introduced at both the interior wall 54 and the exterior wall 55 of the nacelle assembly 26. It should be understood that the airfoil may be stored within the cavity 52 anywhere along the nacelle assembly 26.

Figure 5:
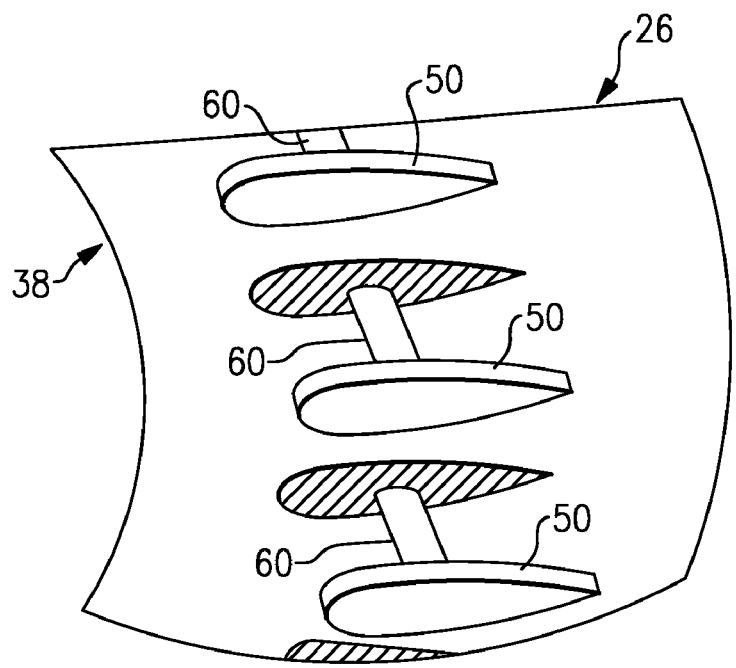
FIG. 5 illustrates a section of the nacelle assembly including a plurality of airfoils.

The simulated increased thickness of the inlet lip section 38 is achieved by introducing the airfoil 50 at the boundary layer 35 in response to a detected operability condition. While a single airfoil 50 is illustrated, a plurality of airfoils 50 could be spaced circumferentially about the nacelle assembly 26 such that the "thick" lip function occurs around the entire circumference of the inlet lip section 38 (See FIG. 5). In addition, it should be understood that the airfoil 50 is not illustrated to the scale it would be in practice. In fact, the airfoil 50 is shown larger than in practice to better illustrate its function.

A sensor 61 detects the operability condition and communicates with a controller 62 to translate the airfoil 50 in a radial outward direction relative to the nacelle assembly 26. Of course, this view is highly schematic. It should be understood that the sensor 61 and the controller 62 may be programmed to detect any known operability condition of the aircraft. Also, the sensor 61 can be replaced by any control associated with the gas turbine engine 10 or an associated aircraft. In fact, the controller 62 itself can generate the signal to translate the airfoil 50.

The airfoil 50 is moveable between a first position X (i.e., the stored position within the cavity 52, represented by phantom lines) and a second position X' (represented by solid lines) via an actuator assembly 56 in response to detecting an operability condition of the gas turbine engine 10, for example. A person of ordinary skill in the art having the benefit of this disclosure would be able to implement an appropriate actuator assembly 56 to translate the airfoil 50, including but not limited to pneumatic, hydraulic and electromechanical actuator assemblies. In another example, the airfoil 50 is moveable to any position between the first position X and the second position X'. The second position X' is radially outward from the first position X.

Figure 6:
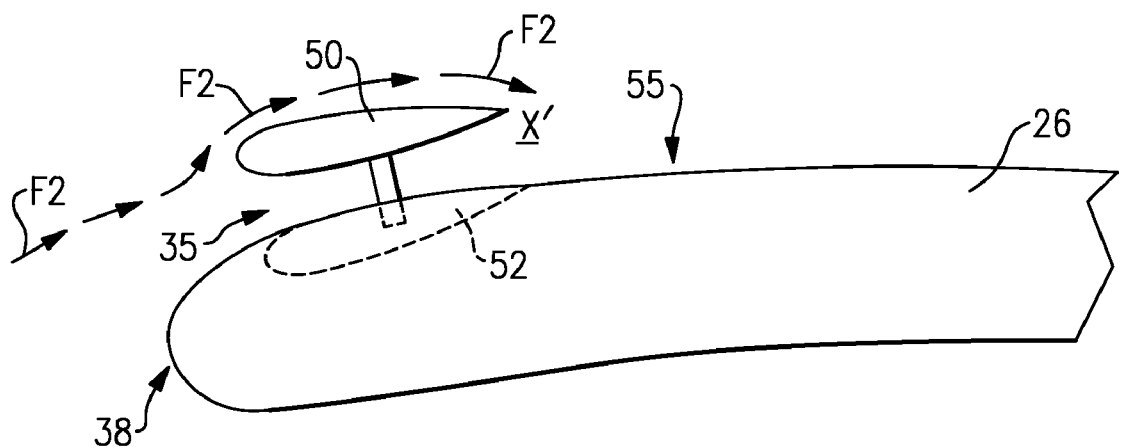
FIG. 6 illustrates a schematic view of a "thick" inlet lip section simulation.

The oncoming airflow F2 is forced to flow around the airfoil 50 in response to translating the airfoil 50 to the second position X', thereby simulating a "thick" inlet lip section 38 as required during certain operability conditions (See FIG. 6). In one example, the operability condition includes a take-off condition. In another example, the operability condition includes a climb condition. In yet another condition, the operability condition includes a crosswind condition. Crosswind conditions are experience during take-off as an aircraft travels down a runway (i.e., where the aircraft experiences airflow in a roughly perpendicular direction with respect to the movement of the aircraft down the runway). In still another example, the operability condition includes a windmilling condition. A windmilling condition occurs when an engine of a multi-engine aircraft loses functionality or is otherwise shut down (i.e., an engine-out condition). The damaged engine is advantageously permitted to rotate, and is driven by an airflow resulting from the forward velocity of the aircraft (i.e., the damaged engine is permitted to "windmill"). It should be understood that the airfoil 50 may be moved to the second position X' in response to any operability condition experienced by the aircraft.

Figure 7:
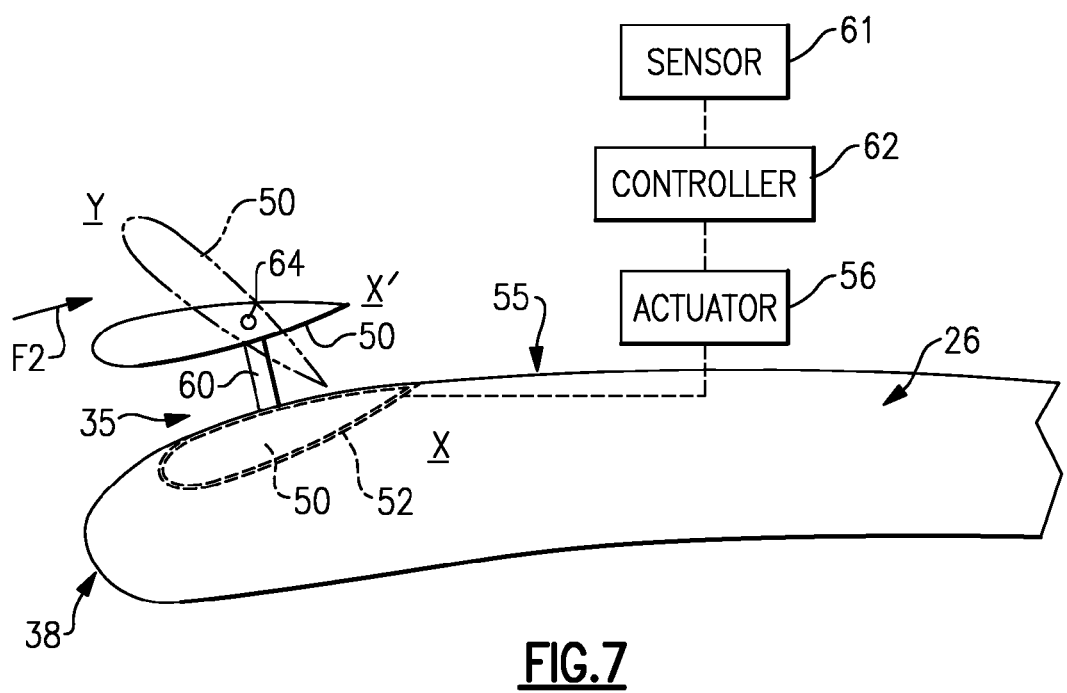
FIG. 7 illustrates another embodiment of the example airfoil.

FIG. 7 illustrates another example arrangement of the airfoil 50. The airfoil 50 is mounted to an arm 60. The arm 60 is actuated by an actuator assembly 56 to move the airfoil 50 between the first position X and the second position X'. In one example, the airfoil is pivotally mounted to the arm 60 with a pivot mount 64, for example. In one example, the pivot mount 64 is a hinge pin. Other types of mounts may also be used to attach the airfoil 50 to the arm 60. A worker of ordinary skill in the art with the benefit of this disclosure would be able to pivotally mount the airfoil 50 to the arm 60.

The airfoil 50 is pivotable between the second position X' to another position Y (represented by phantom lines) by rotating the airfoil 50 about the pivot mount 64. In one example, the position Y is roughly perpendicular to the oncoming airflow F2. Positioning the airfoil 50 at the position Y provides the ability to control a flow stagnation point of a gas turbine engine 10. The flow stagnation point occurs where the velocity gradient of the oncoming airflow F2 is reduced to zero and reverses directions.

In one example, the airfoil 50 is pivoted to the position Y, or any other position between the second position X' and the position Y, in response to an operability condition. The sensor 61 detects the operability condition and communicates with the controller 62 to pivot the airflow 50 about the pivot mount 64 via the actuator assembly 56, for example. In one example, the operability condition includes a takeoff condition. In another example, the operability condition includes a crosswind condition. In yet another example, the operability condition includes a windmilling condition. However, other operability conditions may be suitable for pivoting the airfoil 50 to position Y, or to any other positions. In other words, the controller 62 and the sensor 61 are programmable to detect flow stagnation points and adjust the airfoil 50 accordingly.

Figure 8:
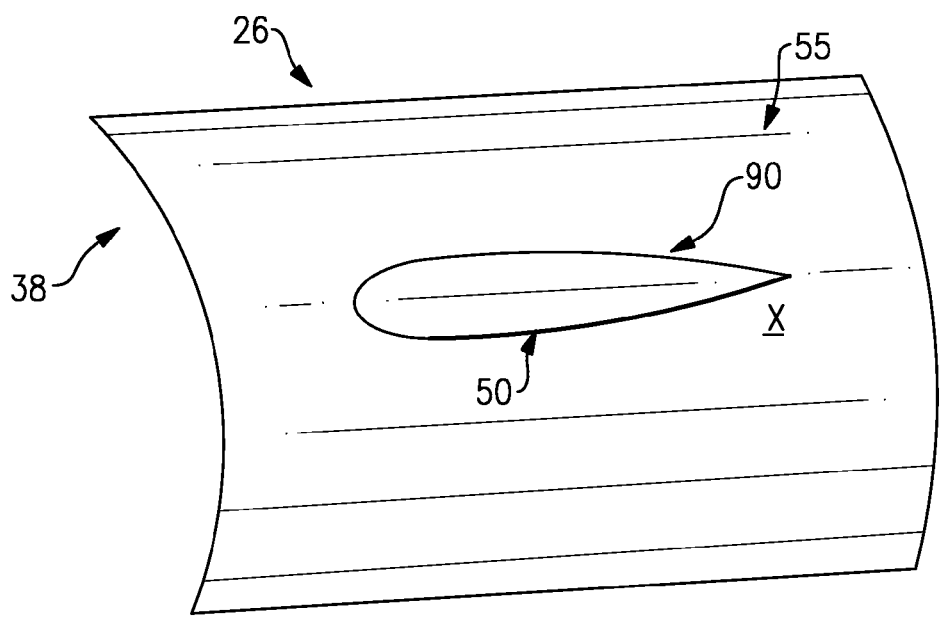
FIG. 8 illustrates yet another embodiment of the airfoil positioned within a cavity of the nacelle assembly illustrated in FIG. 2.

During normal cruise operation (e.g., a generally constant speed at generally constant, elevated altitude), the airfoil 50 is returned to the first position X within the cavity 52 of the nacelle assembly 26. In the stored position, the outer surface 90 of the airfoil 50 is flush with the outer flow surface of the nacelle assembly. For example, where the airfoil 50 is positioned adjacent to the exterior wall 55 of the nacelle assembly 26, the airfoil 50 is flush with the exterior wall 55 where positioned within the cavity 52 (See FIG. 8). The flush surfaces therefore do not disrupt or redirect the oncoming airflow where stored in the position X.

By simulating a "thick" inlet lip section 38 during specific flight conditions, the aircraft may be designed having a "thin" inlet lip section 38 (i.e., a slim-line nacelle having a reduced contraction ration is achieved). Therefore, efficiency is improved during normal cruise operations. Further, by increasing the boundary layer 35 thickness during diverse operability conditions, performance of the gas turbine engine 10 is improved during each specific operability condition. As a result, the nacelle assembly 26 is designed per specific cruise conditions of the aircraft. A reduced maximum diameter of the nacelle assembly 26 may therefore be achieved while reducing weight, reducing fuel burn and increasing the overall efficiency of the gas turbine engine 10.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A nacelle assembly, comprising:
    an inlet lip section; and
    at least one airfoil stored in a cavity defined inside said inlet lip section, wherein said cavity is disposed between a radially outer and a radially inner wall of said inlet lip section, and said at least one airfoil is selectively moveable between a first position and a second position in response to a sensing signal and without moving any other portion of the nacelle assembly to influence a flow of oncoming airflow and influence an effective boundary layer thickness of the nacelle assembly.

2. The assembly as recited in claim 1, wherein said first position is within said cavity and said second position is radially outward relative to said inlet lip section.

3. The assembly as recited in claim 1, wherein said first position is within said cavity and said second position is radially inward relative to said nacelle assembly.

4. The assembly as recited in claim 1, comprising an arm attached to said at least one airfoil.

5. The assembly as recited in claim 4, wherein said at least one airfoil is pivotally attached to said arm via a pivot mount.

6. The assembly as recited in claim 1, wherein an exterior surface of said at least one airfoil is flush with an exterior surface of said nacelle assembly in said first position.

7. The assembly as recited in claim 1, comprising a plurality of airfoils positioned circumferentially about said nacelle assembly adjacent to said inlet lip section.

8. The assembly as recited in claim 1, wherein said at least one airfoil is selectively introduced at both an interior wall and an exterior wall of the nacelle assembly.

9. The assembly as recited in claim 1, comprising an arm connected between opposing ends of said at least one airfoil, wherein said at least one airfoil is pivotally mounted to said arm at a pivot mount.

10. The assembly as recited in claim 1, wherein said at least one airfoil is an intip.

11. The assembly as recited in claim 1, wherein said cavity and said at least one airfoil are of the same shape.

12. A gas turbine engine, comprising:
at least one fan section, at least one compressor section, at least one combustor section and at least one turbine section, wherein said fan section includes a geartrain;
a nacelle assembly at least partially surrounding said at least one compressor section, said at least one combustor section and said at least one turbine section, wherein said nacelle assembly includes an inlet lip section and at least one airfoil adjacent to said inlet lip section, said at least one airfoil selectively moveable between a first position and a second position to influence an effective boundary layer thickness of said nacelle assembly;
a controller that identifies an operability condition, wherein said controller selectively commands movement of said at least one airfoil between said first position and said second position in response to said operability condition; and
a sensor that produces a sensing signal representing said operability condition and communicates said sensing signal to said controller.

13. The gas turbine engine as recited in claim 12, comprising an actuator assembly in communication with said controller to move said at least one airfoil between said first position and said second position in response to detecting said operability condition.

14. The gas turbine engine as recited in claim 12, comprising an arm attached to said at least one airfoil, said at least one airfoil pivotally attached to said arm.

15. The gas turbine engine as recited in claim 12, wherein said nacelle assembly includes a cavity and said at least one airfoil is stored within said cavity in said first position.

16. The gas turbine engine as recited in claim 12, wherein an exterior surface of said at least one airfoil is flush with an exterior surface of said nacelle assembly in said first position.

17. The gas turbine engine as recited in claim 12, comprising a plurality of airfoils positioned circumferentially about said nacelle assembly adjacent to said inlet lip section.

18. The gas turbine engine as recited in claim 12, wherein said at least one airfoil is stored in a cavity defined inside said inlet lip section, said cavity disposed between a radially outer and a radially inner wall of said inlet lip section.

19. A method of increasing an effective boundary layer thickness of an inlet section of a nacelle of a gas turbine engine, comprising the steps of:
(a) sensing an operability condition;
(b) communicating a sensing signal representative of the operability condition; and
(c) selectively translating an airfoil positioned adjacent to the inlet lip section in a radial outward direction from the nacelle without moving any other portion of the nacelle in response to the sensing signal.

20. The method as recited in claim 19, wherein said step (b) comprises:
moving the airfoil between a first position and a second position, wherein the second position is radially outward from the first position.

21. The method as recited in claim 20, comprising the step of:
(c) returning the airfoil to the first position in response to sensing a cruise condition.

22. The method as recited in claim 20, comprising the step of:
(d) pivoting the airfoil from the second position to a third position different than the first position to control a flow stagnation point of oncoming airflow.

23. The method as recited in claim 22, wherein the step of pivoting the airfoil from the second position to the third position includes pivoting the airfoil until the airfoil is substantially perpendicular to a direction of the oncoming airflow.

* * * * *

UNITED STATES PATENT AND TRADEMARK OFFICE
CERTIFICATE OF CORRECTION

PATENT NO. : 8,408,491 B2
APPLICATION NO. : 11/739216
DATED : April 2, 2013
INVENTOR(S) : Jain et al.

It is certified that error appears in the above-identified patent and that said Letters Patent is hereby corrected as shown below:

IN THE CLAIMS:

Claim 21, Column 8, line 22: "(c)" should read as --(d)--

Claim 22, Column 8, line 26: "(d)" should read as --(e)--

Signed and Sealed this
Eighteenth Day of June, 2013

Teresa Stanek Rea
*Acting Director of the United States Patent and Trademark Office*